May 30, 1933.  C. A. WATSON  1,911,333
HOSE COUPLING
Filed May 19, 1932  2 Sheets-Sheet 1
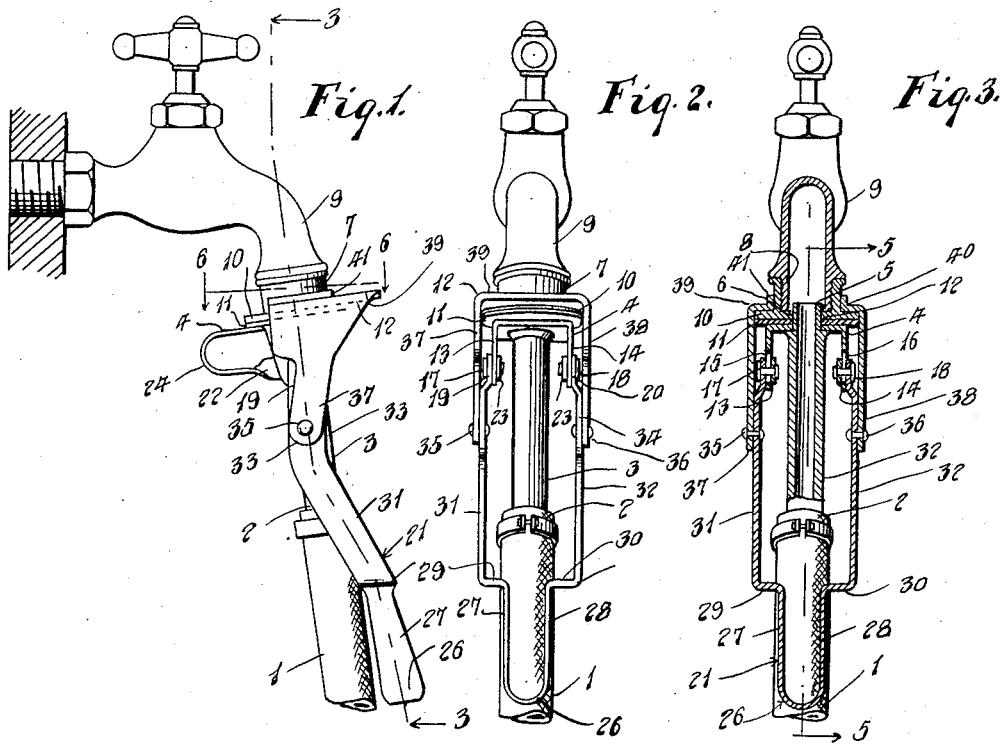
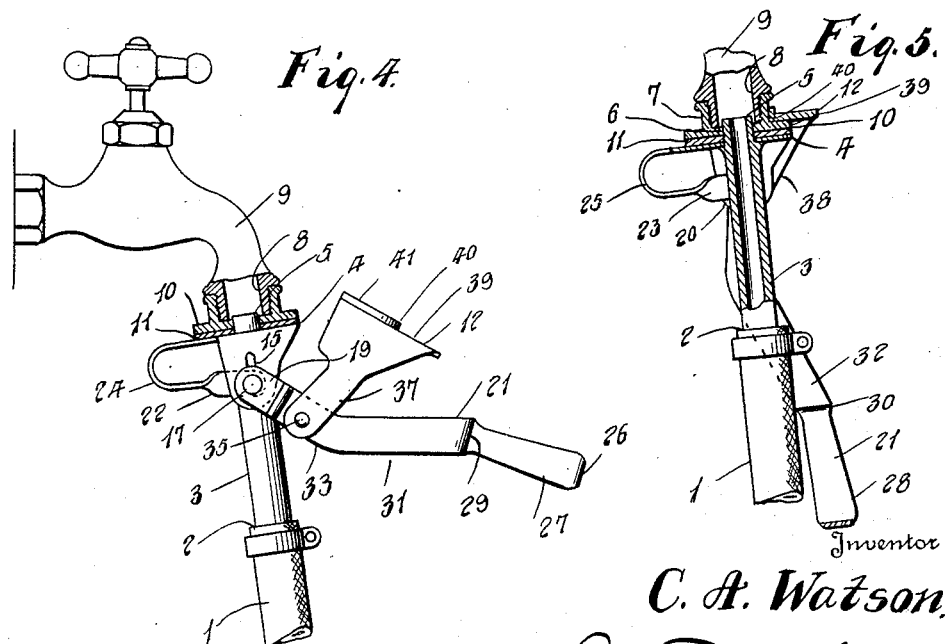
Inventor
C. A. Watson
By L. F. Randolph, Jr.
Attorney

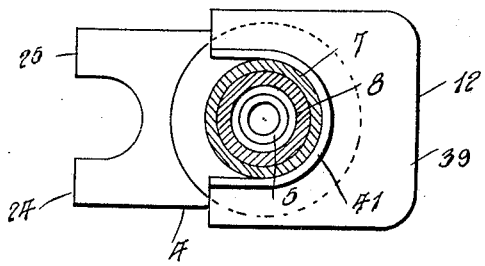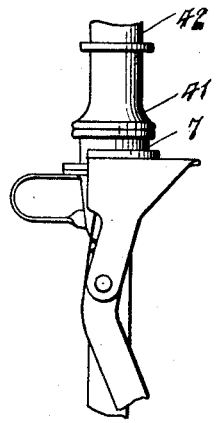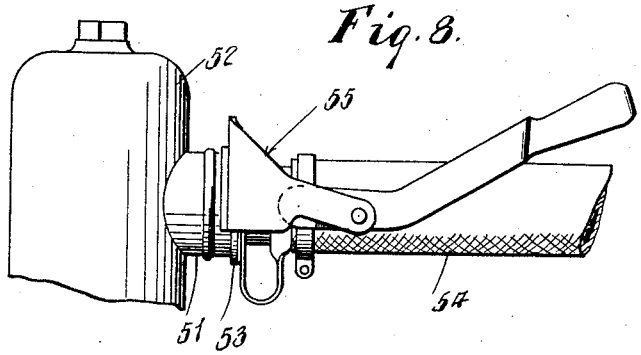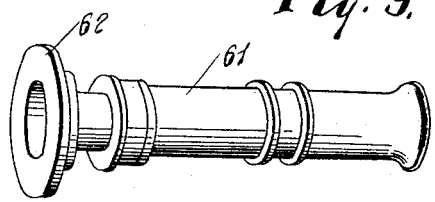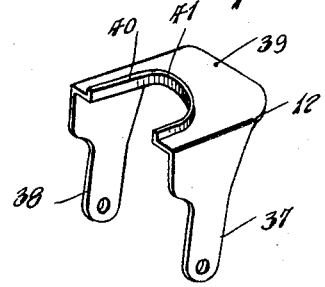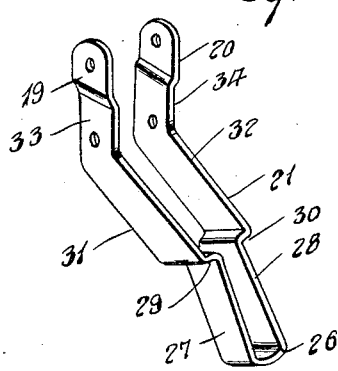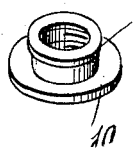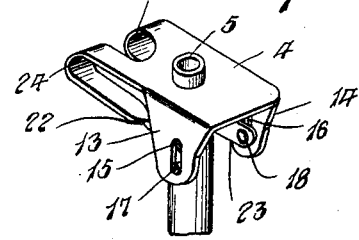

Patented May 30, 1933

1,911,333

UNITED STATES PATENT OFFICE

CHESTER A. WATSON, OF BALLINGER, TEXAS

HOSE COUPLING

Application filed May 19, 1932. Serial No. 612,303.

This invention relates to improvements in hose connections, and has for its object to provide means whereby a garden or other hose may be instantaneously attached to a faucet.

Another object of the invention is to provide means whereby connections of various types may be quickly attached to a water or air hose.

A still further object of the invention is to provide means whereby a fire hose may be instantly connected to a water hydrant, fire plug or the like.

A still further object of the invention is to provide a lever controlled and operated clamp for making hose connections of various kinds.

Another object of the invention is to provide in a hose connection of any nature a spring clamp by means of which a watertight joint may be instantly made.

A still further object of the invention is to provide a hose connection with a compound lever operated spring clamp for securing the members together.

With the above and such other objects in view as may hereinafter more fully appear, the device will be found shown in the accompanying drawings, in which:

Figure 1 is a side elevational view of my device as attached to a water faucet;

Figure 2 is an end view;

Figure 3 is a section on a plane indicated by the line 3—3 of Figure 1;

Figure 4 is another elevational view, partly broken away, showing the parts in released position;

Figure 5 is a fragmentary side view partly broken away and in section, showing the parts in attached position;

Figure 6 is a sectional view on an enlarged scale and on a plane indicated by the line 6—6 of Figure 1;

Figure 7 is a fragmentary elevational view showing the adaptation of the device to use with a hose nozzle;

Figure 8 is a similar view showing adaptation of the device to secure the hose to a water hydrant or fire plug;

Figure 9 is a perspective view of a hose nozzle;

Figure 10 is a view in perspective of one member of the clamp;

Figure 11 is a view in perspective of the operating lever;

Figure 12 is a view in perspective of the other member of the clamp, and

Figure 13 is a view in perspective of the flanged screw collar.

Like reference characters indicate like parts, throughout the following specification and in the several views in the drawings in which 1 indicates a lawn, garden, fire or other hose, having the end 2 thereof secured to a short metal pipe 3, in any approved manner. The free end of the pipe section 2, is fixed to a clamp jaw 4, in any suitable manner, as for instance by being projected through an aperture therein and welded.

The projecting end 5 of said pipe is of a diameter to snugly fit into the aperture 6 of a collar 7, screw-threaded upon the threaded terminal 8 of a faucet 9. Integrally formed on the lower end of the collar 7 is a flange 10, against the under surface of which a rubber or other suitable gasket 11 is adapted to be forced by means of the clamp jaws 4 and 12. The jaw 4 is provided with depending arms 13 and 14 having longitudinal slots 15 and 16 therein, through which pivot pins 17 and 18 on the terminals 19 and 20 of a U-shaped lever 21 project, whereby said pins are attached to the terminals 22 and 23 of the leaf springs 24 and 25, said springs being returned under extensions of the jaw 4. The lever 21 is illustrated as comprising a bar of metal, doubled upon itself to form a lever handle 26, the sides 27 and 28 being provided with angular terminals 29 and 30 from which sides 31 and 32 incline to angular extensions 33 and 34, having the inbent terminals 19 and 20 hereinbefore described engaging the pins 17 and 18. Pivotally mounted on the members 33 and 34, by pins 35 and 36, are the depending ears 37 and 38, of the jaw 12, which includes a plate 39, with an arcuate recess 40, and bordering recess 40 is a flange 41 adapted to seat against the collar 7, when the jaw is in clamping position.

In operating the device the extension 5 of tube 3 is projected into the opening 6 of member 7, then the handle 26 is forced downwardly toward the hose 1. During this movement the jaw 12 is forced in upon the flange 10, the lever 25 moving the jaws 12 and 4 towards one another and into clamping relation upon the flange 10, whereby a water-tight connection is made between the faucet 9 and tube 3. In moving the handle 26 into parallel relation with the hose 1, the pins 17 and 18 have a tendency to flex the springs 24 and 25 to permit members 31 and 32 to assume positions on opposite sides of the pipe 3, and the pivot pins 35 and 36 to move to positions on opposite sides of the center of pins 17 and 18, whereby the members are held in locked position.

In Figure 7 I show a modification of the connection in which the terminal 41 of the nozzle 42 is provided with a threaded end to receive the collar 7, whereby it may be connected with the hose 1, in the same manner as is the faucet 9.

In Figure 8 I show the application of my invention to an outlet 51, of a fire plug 52, said outlet being provided with a flange 53, whereby the fire hose 54 may be rapidly secured to said outlet 51 through a clamp 55, which is constructed identically to the clamp hereinbefore described as to Figures 1 to 7, except that it is of a size to fit the hose 54.

In Figure 9 is shown a modified construction of hose nozzle 61 that is provided with an integral flange 62 to serve the purpose of the flange 10 on sleeve 7.

My above described device provides a water-tight connection which will not leak through wear, as will a screw joint, it is very much quicker to connect than is a screw joint, and obviates reduced pressure through leaks of the connection. This connection may be used by any child or woman as well as a stronger person, and requires no tools to make a secure joint.

I claim:—

1. A hose connection, comprising a tubular member adapted to be secured to a hose, a plate secured to said tubular member, depending ears on said plate provided with openings therein, spring arms extending from said plate and terminating adjacent to said openings, a lever member, pins pivotally connecting said lever member and the spring terminals and extending through the openings in the ears, and a clamping jaw pivotally secured to said lever member remote from the pivot pins and coacting with said plate to engage a water connection.

2. A hose connection, comprising a tubular member adapted to be secured to a hose, a plate secured to said tubular member depending ears on said plate provided with longitudinal slots therein, spring arms extending from said plate and terminating adjacent to said slots, a bifurcated lever member, pins pivotally connecting said lever member and the spring terminals and extending through the slots in the ears, a clamping jaw having depending ears pivotally secured to the fork arms of said lever member remote from the pivot pins and coacting with said plate to engage a water connection, said fork arms having angularly disposed portions whereby the pivots of the clamping jaw are moved to a position on the opposite side of the center of the pivot pins from the free end of the lever when in clamping position whereby the clamping jaw is held in clamped position.

In testimony whereof I affix my signature.

CHESTER A. WATSON.